(12) United States Patent
Oakeson

(10) Patent No.: US 9,557,776 B1
(45) Date of Patent: Jan. 31, 2017

(54) FRICTION RESISTANCE HINGE WITH AUTO-LOCK

(71) Applicant: ZAGG Intellectual Property Holding Co., Inc., Midvale, UT (US)

(72) Inventor: Dan Oakeson, West Jordan, UT (US)

(73) Assignee: ZAGG Intellectual Property Holding Co., Inc., Midvale, UT (US)

( * ) Notice: Subject to any disclaimer, the term of this patent is extended or adjusted under 35 U.S.C. 154(b) by 0 days.

(21) Appl. No.: 15/150,665

(22) Filed: May 10, 2016

(51) Int. Cl.
*G06F 1/16* (2006.01)
*E05D 11/10* (2006.01)
*E05D 3/02* (2006.01)
*E05D 11/08* (2006.01)

(52) U.S. Cl.
CPC .............. *G06F 1/1679* (2013.01); *E05D 3/02* (2013.01); *E05D 11/087* (2013.01); *E05D 11/1064* (2013.01); *G06F 1/1681* (2013.01); *Y10T 16/5403* (2015.01)

(58) Field of Classification Search
CPC ........ G06F 1/1679; G06F 1/1681; E05D 3/02; E05D 11/1007; E05D 11/087; Y10T 16/5403; Y10T 16/5387; Y10T 16/540225; Y10T 16/540345; H05K 5/0226
USPC ............. 16/337, 303, 330, 340; 361/679.27; 248/357
See application file for complete search history.

(56) References Cited

U.S. PATENT DOCUMENTS

| 676,449 | A | 6/1901 | Schwarz |
| 4,259,568 | A | 3/1981 | Dynesen |
| D279,185 | S | 6/1985 | Felix et al. |
| 5,375,076 | A | 12/1994 | Goodrich et al. |
| 5,383,138 | A | 1/1995 | Motoyama et al. |
| 5,383,139 | A | 1/1995 | Saji et al. |
| 5,457,453 | A | 10/1995 | Chiu et al. |
| 5,594,619 | A | 1/1997 | Miyagawa et al. |
| 5,666,694 | A | 9/1997 | Slow et al. |
| 5,737,183 | A | 4/1998 | Kobayashi et al. |
| 5,847,698 | A | 12/1998 | Reavey et al. |
| 5,987,704 | A | 11/1999 | Tang |
| 6,144,551 | A | 11/2000 | Kao |
| 6,219,230 | B1 | 4/2001 | Cho |
| 6,253,419 | B1 | 7/2001 | Lu |
| 6,304,433 | B2 | 10/2001 | O'Neal et al. |
| 6,370,018 | B1 | 4/2002 | Miller, Jr. et al. |

(Continued)

OTHER PUBLICATIONS

'Big Blue'-Tooth™ Keyboards & LARGEKeys Keybords; http://rjcooper.com/big-blue-tooth-keyboard/index.html; accessed Nov. 20, 2013; 5 pages.

(Continued)

*Primary Examiner* — William Miller
(74) *Attorney, Agent, or Firm* — Thorpe, North & Western, LLP

(57) ABSTRACT

A hinge resistively holds an orientation between first and second members. The hinge has an elongated shaft with a head mating with a bore in the first member. A key is rotatably disposed on an axel portion of the shaft and has a tab mating with a slot in the second member. A friction ring is disposed on the shaft adjacent the key, and keyed to rotated with the shaft. The friction ring and the key have opposing bearing surfaces to hold their relative position by friction. One of the friction ring and the key can have a dimple while the other has a detent. A spring is carried by the shaft and biases the key and the friction ring together.

19 Claims, 5 Drawing Sheets

(56) References Cited

U.S. PATENT DOCUMENTS

| | | | |
|---|---|---|---|
| D457,525 S | 5/2002 | Olodort et al. | |
| 6,457,996 B1 | 10/2002 | Shih | |
| 6,493,216 B1 | 12/2002 | Lin | |
| 6,498,718 B1 | 12/2002 | Kim et al. | |
| 6,498,720 B2 | 12/2002 | Glad | |
| 6,517,129 B1 | 2/2003 | Chien et al. | |
| 6,614,649 B1 | 9/2003 | Wang | |
| 6,694,570 B2 | 2/2004 | Chen | |
| 6,700,775 B1 | 3/2004 | Chuang et al. | |
| 6,768,635 B2 | 7/2004 | Lai et al. | |
| 6,771,494 B2 | 8/2004 | Shimano | |
| 6,774,888 B1 | 8/2004 | Genduso | |
| 6,785,128 B1 | 8/2004 | Yun | |
| 6,898,073 B2 | 5/2005 | Lin | |
| 6,920,039 B2 | 7/2005 | Mochizuki et al. | |
| 6,937,468 B2 | 8/2005 | Lin et al. | |
| 7,017,243 B2 | 3/2006 | Carnevali | |
| 7,042,712 B2 | 5/2006 | Ghosh et al. | |
| 7,082,642 B2 * | 8/2006 | Su | E05D 11/087 16/330 |
| 7,085,129 B2 | 8/2006 | Hsu | |
| 7,123,242 B1 | 10/2006 | Henty | |
| 7,129,931 B2 | 10/2006 | Pappas | |
| 7,222,396 B2 * | 5/2007 | Lu | E05D 11/087 16/330 |
| 7,318,521 B2 | 1/2008 | Lau | |
| 7,393,151 B1 | 7/2008 | Miller, Jr. | |
| 7,477,508 B1 | 1/2009 | Pilkington et al. | |
| 7,484,271 B2 | 2/2009 | Oshima et al. | |
| 7,502,225 B2 | 3/2009 | Solomon et al. | |
| 7,520,025 B2 * | 4/2009 | Hung | G06F 1/1632 16/337 |
| 7,520,026 B1 * | 4/2009 | Lin | E05D 11/06 16/337 |
| 7,520,027 B2 * | 4/2009 | Lu | G06F 1/1681 16/337 |
| 7,533,446 B1 * | 5/2009 | Lin | G06F 1/1616 16/303 |
| 7,540,675 B2 | 6/2009 | Liu | |
| 7,541,907 B2 | 6/2009 | Wang et al. | |
| 7,583,500 B2 | 9/2009 | Ligtenberg et al. | |
| 7,603,747 B2 * | 10/2009 | Ho | G06F 1/1616 16/330 |
| 7,612,989 B2 | 11/2009 | Northway | |
| 7,626,357 B2 | 12/2009 | Hoffman et al. | |
| D611,045 S | 3/2010 | Andre et al. | |
| 7,669,286 B2 * | 3/2010 | Lu | G06F 1/1681 16/337 |
| 7,672,699 B2 | 3/2010 | Kim et al. | |
| 7,685,679 B2 * | 3/2010 | Horng | G06F 1/1616 16/250 |
| 7,730,587 B2 | 6/2010 | Chang et al. | |
| D620,001 S | 7/2010 | Reed et al. | |
| 7,823,254 B2 * | 11/2010 | Lin | E05D 11/087 16/330 |
| 7,870,644 B2 * | 1/2011 | Chang | G06F 1/1616 16/303 |
| D637,596 S | 5/2011 | Akana et al. | |
| 7,966,040 B2 | 6/2011 | Kim et al. | |
| D643,433 S | 8/2011 | Hsieh et al. | |
| 7,987,556 B2 * | 8/2011 | Chang | G06F 1/1616 16/330 |
| 7,992,255 B2 * | 8/2011 | Chang | H04M 1/0216 16/330 |
| 8,015,668 B2 * | 9/2011 | Wang | G06F 1/1681 16/303 |
| 8,082,626 B2 * | 12/2011 | Chiang | G06F 1/1679 16/297 |
| D652,831 S | 1/2012 | Lee et al. | |
| 8,139,357 B2 | 3/2012 | Trang | |
| 8,143,983 B1 | 3/2012 | Lauder et al. | |
| D659,139 S | 5/2012 | Gengler | |
| 8,196,262 B2 * | 6/2012 | Chang | G06F 1/1681 16/303 |
| 8,230,992 B2 | 7/2012 | Law et al. | |
| 8,253,595 B2 | 8/2012 | Yang et al. | |
| D671,541 S | 11/2012 | Gengler | |
| D672,352 S | 12/2012 | Gengler | |
| D673,574 S | 1/2013 | Gengler | |
| 8,363,014 B2 | 1/2013 | Leung et al. | |
| D676,031 S | 2/2013 | Melville et al. | |
| D676,448 S | 2/2013 | Gorman et al. | |
| D676,449 S | 2/2013 | Probst et al. | |
| D676,853 S | 2/2013 | Gengler | |
| 8,385,063 B2 | 2/2013 | Zhu et al. | |
| D678,885 S | 3/2013 | Gengler | |
| 8,390,412 B2 | 3/2013 | Lauder et al. | |
| D679,277 S | 4/2013 | Probst et al. | |
| D682,274 S | 5/2013 | Gengler | |
| D684,963 S | 6/2013 | Goodrich | |
| 8,467,186 B2 | 6/2013 | Zeliff et al. | |
| D689,054 S | 9/2013 | Snyder | |
| 8,542,495 B2 | 9/2013 | Gorman et al. | |
| 8,570,726 B2 | 10/2013 | Wu et al. | |
| D692,886 S | 11/2013 | Bates et al. | |
| D694,248 S | 11/2013 | Van Natta | |
| 8,599,542 B1 | 12/2013 | Healey et al. | |
| D701,210 S | 3/2014 | Bates et al. | |
| D701,857 S | 4/2014 | Ding | |
| 8,817,457 B1 | 8/2014 | Colby et al. | |
| 8,837,131 B1 * | 9/2014 | Colby | G06F 1/1667 361/679.06 |
| D714,790 S | 10/2014 | Probst et al. | |
| D722,057 S | 2/2015 | Schoenith et al. | |
| D727,917 S | 4/2015 | Yeo | |
| 9,172,419 B2 | 10/2015 | Su et al. | |
| 2001/0009500 A1 | 7/2001 | Selker | |
| 2001/0040559 A1 | 11/2001 | Bullister | |
| 2002/0033761 A1 | 3/2002 | Katakami et al. | |
| 2002/0159226 A1 | 10/2002 | Huang et al. | |
| 2003/0017746 A1 | 1/2003 | Lee | |
| 2003/0048595 A1 | 3/2003 | Hsieh et al. | |
| 2003/0112585 A1 | 6/2003 | Silvester | |
| 2003/0112590 A1 | 6/2003 | Shimano et al. | |
| 2003/0198008 A1 | 10/2003 | Leapman et al. | |
| 2004/0004809 A1 | 1/2004 | Mochizuki et al. | |
| 2004/0033096 A1 | 2/2004 | Choi et al. | |
| 2004/0114315 A1 | 6/2004 | Anlauff | |
| 2004/0136149 A1 | 7/2004 | Wang et al. | |
| 2004/0159762 A1 | 8/2004 | Ghosh | |
| 2004/0160735 A1 | 8/2004 | Ghosh et al. | |
| 2004/0169995 A1 | 9/2004 | Ghosh et al. | |
| 2004/0195305 A1 | 10/2004 | Dotson | |
| 2004/0209489 A1 | 10/2004 | Clapper | |
| 2004/0212954 A1 | 10/2004 | Ulla et al. | |
| 2004/0232302 A1 | 11/2004 | Huang et al. | |
| 2005/0052831 A1 | 3/2005 | Chen | |
| 2005/0122671 A1 | 6/2005 | Homer | |
| 2005/0146446 A1 | 7/2005 | Hsu | |
| 2005/0155182 A1 | 7/2005 | Han et al. | |
| 2005/0168925 A1 | 8/2005 | Fang et al. | |
| 2005/0200608 A1 | 9/2005 | Ulla et al. | |
| 2005/0236869 A1 | 10/2005 | Ka et al. | |
| 2006/0007645 A1 | 1/2006 | Chen et al. | |
| 2006/0044288 A1 | 3/2006 | Nakamura et al. | |
| 2006/0071820 A1 | 4/2006 | Wang et al. | |
| 2006/0152894 A1 | 7/2006 | Moengen | |
| 2006/0152897 A1 | 7/2006 | Hirayama | |
| 2006/0214916 A1 | 9/2006 | Mulford | |
| 2006/0256511 A1 | 11/2006 | Ma | |
| 2006/0262496 A1 | 11/2006 | Lee | |
| 2006/0264243 A1 | 11/2006 | Aarras | |
| 2007/0008291 A1 | 1/2007 | Liu | |
| 2007/0091553 A1 | 4/2007 | Chang | |
| 2007/0097087 A1 | 5/2007 | Homer et al. | |
| 2007/0203963 A1 | 8/2007 | Chen et al. | |
| 2008/0084396 A1 | 4/2008 | Pen | |
| 2008/0119250 A1 | 5/2008 | Cho et al. | |
| 2008/0125200 A1 | 5/2008 | Park et al. | |
| 2008/0139261 A1 | 6/2008 | Cho et al. | |
| 2008/0176610 A1 | 7/2008 | Pan et al. | |

(56) References Cited

U.S. PATENT DOCUMENTS

| | | |
|---|---|---|
| 2008/0194139 A1 | 8/2008 | Chan |
| 2008/0225471 A1 | 9/2008 | Takizawa |
| 2008/0273012 A1 | 11/2008 | Bullister |
| 2009/0000062 A1 | 1/2009 | Yamanami |
| 2009/0017883 A1 | 1/2009 | Lin |
| 2009/0056073 A1 | 3/2009 | Lin |
| 2009/0086424 A1 | 4/2009 | Jette |
| 2010/0123663 A1 | 5/2010 | Leung et al. |
| 2010/0141588 A1 | 6/2010 | Kimura et al. |
| 2010/0157518 A1 | 6/2010 | Ladouceur et al. |
| 2010/0172081 A1 | 7/2010 | Tian et al. |
| 2010/0195279 A1 | 8/2010 | Michael |
| 2010/0294909 A1 | 11/2010 | Hauser et al. |
| 2011/0199727 A1 | 8/2011 | Probst |
| 2011/0222238 A1 | 9/2011 | Staats et al. |
| 2011/0267757 A1 | 11/2011 | Probst |
| 2012/0008269 A1 | 1/2012 | Gengler |
| 2012/0008299 A1 | 1/2012 | Gengler |
| 2012/0009000 A1 | 1/2012 | Starrett |
| 2012/0012483 A1 | 1/2012 | Fan |
| 2012/0074271 A1 | 3/2012 | Goetz |
| 2012/0106059 A1 | 5/2012 | Probst et al. |
| 2012/0106060 A1 | 5/2012 | Probst |
| 2012/0106061 A1 | 5/2012 | Probst et al. |
| 2012/0106062 A1 | 5/2012 | Probst et al. |
| 2012/0106078 A1 | 5/2012 | Probst et al. |
| 2012/0114198 A1 | 5/2012 | Yang et al. |
| 2012/0140396 A1 | 6/2012 | Zeliff et al. |
| 2012/0170198 A1 | 7/2012 | Wu et al. |
| 2012/0188697 A1 | 7/2012 | Cheng et al. |
| 2012/0194448 A1 | 8/2012 | Rothkopf |
| 2012/0243149 A1 | 9/2012 | Gartrell et al. |
| 2012/0293953 A1 | 11/2012 | Wu et al. |
| 2012/0327580 A1 | 12/2012 | Gengler |
| 2012/0327594 A1 | 12/2012 | Gengler |
| 2013/0088431 A1 | 4/2013 | Ballagas et al. |
| 2013/0134061 A1 | 5/2013 | Wu et al. |
| 2013/0170126 A1 | 7/2013 | Lee |
| 2013/0229354 A1 | 9/2013 | Whitt et al. |
| 2013/0229773 A1 | 9/2013 | Siddiqui et al. |
| 2013/0242490 A1 | 9/2013 | Ku |
| 2013/0242492 A1 | 9/2013 | Griffin et al. |
| 2013/0279096 A1 | 10/2013 | Gengler |
| 2013/0301205 A1 | 11/2013 | Fyke |
| 2014/0043743 A1 | 2/2014 | Liang |
| 2014/0055920 A1 | 2/2014 | Liang |
| 2014/0071654 A1 | 3/2014 | Chien et al. |
| 2015/0342067 A1* | 11/2015 | Gault .................. H05K 5/0226 248/357 |
| 2015/0362962 A1* | 12/2015 | Lee ...................... G06F 1/1601 361/679.21 |

OTHER PUBLICATIONS

Belkin, Portable Keyboard Case for iPad mini; www.belkinbusiness.com/products; accessed Nov. 20, 2013; 1 page.
Belkin; Portable Keyboard Case for 7" Tablets; www.belkinbusinee,com/products/; accessed Nov. 20, 2013; 2 pages.
Brydge; http://thebrydge.com/ accessed Apr. 12, 2013.
ClamCase® iPad Keyboard Cases & Stands; http://clamcase.com/ accessed Apr. 12, 2013.
Cooper Infinite Universal 8"-10" Tablet Folio; www.tablet2cases.com/cooper-infinite-universal-8-10-tablet-folio; accessed Nov. 20, 2013; 8 pages.
Crux360-CruxCase; http://www.cruxcase.com/products/crux360-for-ipad-3 accessed Apr. 12, 2013.
CruxFLIP-CruxCase; http://www.cruxcase.com/products/cruxflip-3/ accessed Apr. 12, 2013.
CruxSKUNK-CruxCase; http://www.cruxcase.com/products/cruxshunk/ accessed Apr. 12, 2013.
Eee Pad Transformer TF101; http://www.asus.com/Tablets_Mobile/Eee_Pad_Transformer_TF101 accessed Apr. 12, 2013.
Folding Keyboard, by Yoonsang Kim & Eunsung Park; http://www.yankodesign.com/2009/12/II/folding-fan-is_a_keyboard/ accessed Dec. 11, 2009; pp. 3.
Griffin Folio, Wireless Keyboard and Folio Case, 2 pages, accessed Nov. 10, 2014.
Herrman; "Always Innovating Half-Netbook, Half-Tablet Ships in July, Still $300"; Jun. 25, 2009; 2 pages.
iPad Keyboards, Cases, & Stands; Logitech Keyboard Case for iPad 3 & 4; ZAGG Keyboards & Cases; http://www.zagg.com/keyboard-cases/index.php accessed Apr. 12, 2013.
iPad Keyboards, Cases, & Stands; ZAGGkeys FLEX; ZAGG Keyboards & Cases; http://www.zagg.com/keyboard-cases/index.php accessed Apr. 12, 2013.
iPad Keyboards, Cases, & Stands; ZAGGkeys Pro; ZAGG Keyboards & Cases; http://www.zagg.com/keyboard-cases/index.php accessed Apr. 12, 2013
iPad Keyboards, Cases, & Stands; ZAGGkeys PROfolio +; ZAGG Keyboards http://www.zagg.com/keyboard-cases/index.php accessed Apr. 12, 2013.
iPad Keyboards, Cases, & Stands; ZAGGkeys PROfolio; ZAGG Keyboards & Cases; http://www.zagg.com/keyboard-cases-index.php accessed Apr. 12, 2013.
iPad Keyboards, Cases, & Stands; ZAGGkeys PROplus iPad Keyboard; http://www.zagg.com/keyboard-cases/index.php accessed Apr. 12, 2013.
Kensington Key Folio, Pro 2 Universal Removable Keyboard Case and Stand for 10" Tablets, 3 pages, accessed Nov. 10, 2014.
Kickstarter; Brydge + iPad: Do more. By Brad Leong; http://www.kickstarter.com/projects/552506690/brydge-ipad-do-more?play=1&ref=search accessed Apr. 15, 2013.
Lenovo Ideapad U1 Hybrid Notebook; http:uncrate.com/stuff/lenovo-ideapad-u1-hybrid-notebook/ accessed Apr. 12, 2013
Logitech Ultra Thin Folio, Wireless Keyboard and Folio Case, 3 pages, accessed Nov. 6, 2014.
Miller; "The Dawn of the Tablet PC: CES 2010 Roundup"; Jan. 7, 2010 ; 2 pages.
Stein; "Lenovo meshes tablet and Netbook in one device with IdeaPad U1 Hybrid Notebook"; Jan. 4, 2010; 3 pages.
Stern, Joanna; Lenovo Idea Pad U1 Hybrid: laptop by day, unhinged tablet by night; Jan. 4, 2010; 1 page.
Stern; "Lenovo IdeaPad U1 Hybrid hands-on and impressions"; Jan. 5, 2010; 4 pages.
Sutter; "What is a tablet, anyway?"; Jan. 9, 2010;3 pages.
The gadgeteer; *ZAGG introduces a Universal Bluetooth Keyboard*—thegadgeteer.com/2013/07/23/zagg-introducesa-universal-bluetooth-keyboard/; accessed Nov. 20, 2013; 7 pages.
ThinkPad Helix; Tablet Laptop Hybrid: ThinkPad Helix Ultrabook Laptop; Lenovo; accessed Nov. 20, 2013; 2 pages.
Tmart; Black Friday; 6-8 Universal Tablet PC Leather Case Cover with Plug-in Card Yellow—Tmart.com; accessed Nov. 20, 2013; 3 pages.
Ultrathin Keyboard Cover for iPad—Logitech; UltrathinKeyboard Cover; http://www.logitech.com/en-us/product/ultrathin-keyboard-cover accessed Apr. 12, 2013.
Wholesale—7 inch 8 inch 9 inch 10 inch 10.1 inch tablet case folio PU leather adjustable case cover sheath; http://www.dhgate.com/product/7-inch-8-inch-9inch-9-7inch-10-inch-10-1; 1 page.
Wholesale—DHL Freeshipping 10" 10.1" Inch Tablet PC USB Keyboard Cover Leather Case for 10" 10.1" 10.@" MID Tablet Best Gift for Christmas; accessed Nov. 20, 2013; 1 page.
Wholesale—Hot PU Leather Case Cover Holder with Wireless Bluetooth Keyboard Keypad for iPad Mini with Stand Function Green Free Shipping; http://image.dhgate.com/albu_367587927_00-1.0x0/hot-pu-_leather-case-cover-holder-with-wireless; accessed Nov. 20, 2013; 1 page.

* cited by examiner

FRICTION RESISTANCE HINGE WITH AUTO-LOCK

RELATED APPLICATION(S)

This is related to U.S. patent application Ser. No. 15/150,748, filed May 10, 2016, entitled "Keyboard Folio with Attachment Strip"; which is hereby incorporated herein by reference in its entirety.

BACKGROUND

Field of the Invention

The present invention relates generally to a friction hinge. More particularly, the present invention relates to a friction hinge for a keyboard folio for a tablet computer.

Related Art

Laptop computers can have a keyboard pivotally coupled to a screen by a hinge. Similarly, folios for tablet computers can include a hinge. Such hinges can be subject to force and abuse, and can become a failure point.

SUMMARY OF THE INVENTION

It has been recognized that it would be advantageous to develop a friction hinge to pivotally couple two members, such as members of a keyboard folio for a tablet computer, and hold or maintain the orientation of the two members with respect to one another while allowing the orientation to be changed by an applied force. In addition, it has been recognized that it would be advantageous to develop a fiction hinge with an auto-lock function to bias and maintain the orientation of the two members in a predetermined orientation. In addition, it has been recognized that it would be advantageous to develop a friction hinge capable of being tailored to the particular use. Furthermore, it has been recognized the it would be advantageous to develop a friction hinge capable of being mounted without brackets and/or fasteners or screws.

The invention provides a hinge to be coupled between first and second members, and to resistively hold an orientation between the first and second members at a plurality of orientations, and/or to bias the first and second members in a predetermined set orientation. The hinge comprises an elongated shaft having a proximal end and a distal end. A head is disposed on the distal end of the shaft, and has a cross-sectional shape to mate with a shape of a bore in the first member, such that the shaft rotates with the first member with respect to the second member. An axel portion on the shaft has a cross-sectional shape that is non-circular. A key is rotatably disposed on the axel portion of the shaft. The key has a key ring rotatably disposed on the axel portion of the shaft, and a tab extending from the key ring. The tab has a profile to mate with a shape of a slot in the second member, such that the key rotates with the second member with respect to the first member. A friction ring is disposed on the axel portion of the shaft proximal the key, and rotatable with the shaft and with respect to the key. The friction ring has a bore with a shape that mates with the cross-sectional shape of the axel portion of the shaft. The key is held in position with respect to the axel portion, and thus the second member is held in position with respect to the first member, by friction between the key and the friction ring. A spring is carried by the shaft and biases the key and the friction ring together. A fastener is disposed on the shaft with the spring between the fastener and the key and the friction ring.

In a more detailed aspect of the invention, the hinge can further comprise, or the friction ring can be a detent ring comprising, a dimple formed in the key ring of the key or the friction ring, and a detent extending axially from another of the key ring or the friction ring and removably received within the dimple. The spring biases the detent into engagement with the dimple. The key rotates on the shaft between a plurality of different orientations, including at least: 1) a predetermined set orientation in which the detent is disposed in the dimple, defining an autolock orientation, and in which a greater amount of force is required to rotated the key out of the predetermined set orientation; and 2) a friction hold orientation, different than the predetermined set orientation, in which the detent is disposed out of the dimple, and in which the key is held with respect to the shaft by friction between the key and the friction ring, and in which a lesser amount of force is required to rotate the key with respect to the shaft.

In a more detailed aspect of the invention, the key and the friction ring can further comprise a series of key plates and friction rings disposed on the axel portion of the shaft. The series of key plates and friction rings can comprise a plurality of key plates, or a plurality of friction rings, or both. The key plates are rigidly affixed to one another and rotate together as a key on the axel portion of the shaft. Each key plate has a bore to rotatably receive the shaft therein, and a tab and an aperture in the tab. A rod extends through the aperture in each tab of each key plate to rigidly affix the plurality of key plates together. Each key plate has a bearing surface oriented to face axially with respect to the shaft. The friction rings are rotatable with the shaft and with respect to adjacent key plates. Each friction ring has a bore with a shape that mates with the cross-sectional shape of the axel portion of the shaft. Each friction ring having a bearing surface rotatably abutting to an opposing bearing surface of an adjacent key plate. The series of key plates and friction rings can comprise at least one key plate and at least two friction rings. The series of key plates and friction rings can comprise at least two key plates and at least one friction ring.

In a more detailed aspect of the invention, the key can further comprise a plurality of key plates rigidly affixed to one another with each key plate having a bore to rotatably receive the shaft therein and a tab and an aperture in the tab, and a rod extending through the aperture in each tab of each key plate to rigidly affix the plurality of key plates together. An intermediate friction ring can be disposed between adjacent key plates of the plurality of key plates. The intermediate friction ring has opposite bearing surfaces rotatably abutting to opposing bearing surfaces of the adjacent key plates. Each key plate can have a dimple formed in a key ring thereof. An intermediate detent ring can be disposed between adjacent key plates of the plurality of key plates. The intermediate detent ring is disposed on the axel portion of the shaft and is rotatable with the shaft and with respect to the adjacent key plates. The intermediate detent ring has a bore with a shape that mates with the cross-sectional shape of the axel portion of the shaft. The intermediate detent ring has a detent extending axially from the intermediate detent ring and into engagement with the key ring and removably received within the dimple of the key ring.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1b is a front perspective view of the friction hinge of FIG. 1a;

FIG. 2 is an exploded perspective view of the friction hinge of FIG. 1a;

FIG. 3 is rear view of the friction hinge of FIG. 1a;

FIG. 4 is a side view of the friction hinge of FIG. 1a;

Figure 1A:
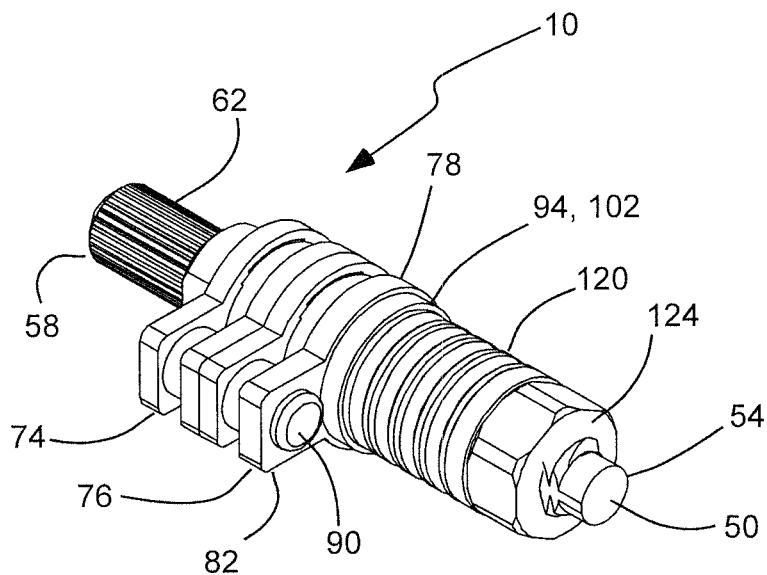
FIG. 1a is a rear perspective view of a friction hinge in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The terms "tablet computer" and "tablet" are used interchangeably herein to refer to a computer or multi-media device that is one-piece with a screen and that is portable and handheld. Examples of tablets include the Apple™ iPad™, the Samsung™ Galaxy™ Tab™, etc. The screen can be a touch screen that can receive input by touch, such as finger swipes, and/or can have a virtual keyboard. The tablet can have a battery and memory and a processor with software running thereon. The tablet can have WiFi and Bluetooth connectivity, and can have a wireless transmitter, receiver, or transceiver. Thus, the tablet can provide internet browsing, game playing, movie and picture display, e-book display, etc. In addition, the tablet can include a digital camera. Furthermore, the terms tablet computer and tablet are used broadly herein to refer to cellular or cell phones (or smart phones) and phablets, which also provide similar computing capabilities, battery power, memory, processor, software, WiFi and Bluetooth connectivity, transceiver, touch screen display, digital camera, etc. Examples of cell phones and phablets include the Apple iPhone, the Samsung Galaxy S phone series, the Samsung Note 3 phablet, HTC One Max, Nokia Lumina 1520, etc.

The terms "interference fit" and "friction fit" are terms of art used interchangeably herein to refer to deliberately causing, increasing and/or using friction to deliberately resist movement. An interference fit or friction fit is different than and great than the existence of friction. While friction may exist between any two surfaces, is often desirable to do all one can to reduce this friction. An interference fit or friction fit can be distinguished from naturally occurring friction by being actually deliberately caused and increased. An interference fit can be created by dimensioning engaging parts so that their surfaces tightly bear against one another. A friction fit can be created by surface roughness that is rougher. An interference fit or friction fit can be used to describe a connection in which the matching or mating between components is configured to have greater than normal friction and/or interference.

DESCRIPTION

The present invention presents a friction hinge to pivotally couple two members, such as members of a keyboard folio for a tablet computer, and hold or maintain the orientation of the two members with respect to one another while allowing the orientation to be changed by an applied force. The two members of the keyboard folio can include a first member, such as a kickstand, pivotally coupled to a second member, such as a shell receiving a tablet computer therein. The kickstand can pivot from the shell to maintain an inclined angle of the shell, and thus the table, on a support surface. The hinge can have an auto-lock function to bias and maintain the orientation of the two members in a predetermined orientation. For example, the hinge can bias the kickstand to a retracted orientation or storage configuration against the shell, thus maintaining the kickstand out of the way while the shell, and thus the tablet are held, and until desired for use when it can be deployed, without the need for magnets or other means to hold the kickstand to the shell. The hinge can be tailored or customized to provide the desired resistance or torque to adjust the relative orientations of the two members, or kickstand and shell, between different designs. The hinge can be formed of hinge components that can be massed produced, and assembled to have different properties for different products suited to different members. In addition, the hinge can be mounted without brackets and/or other fasteners or screws.

Figure 1B:
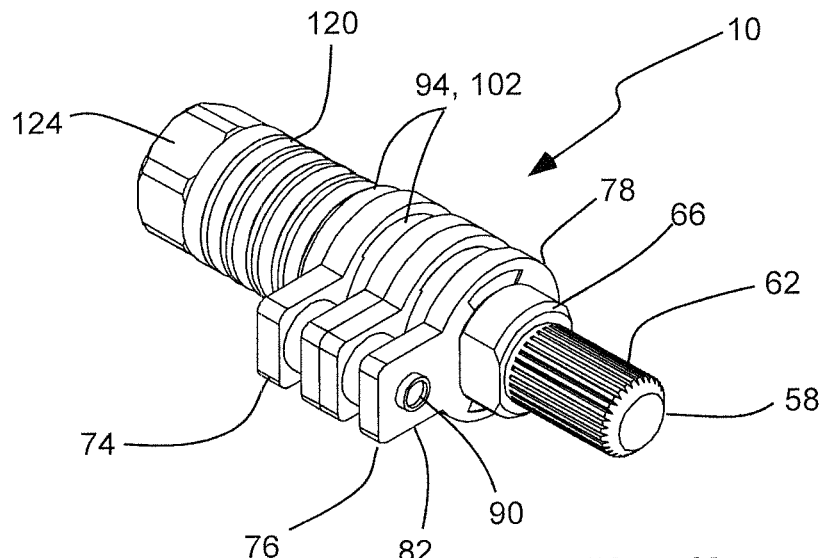
Figure 2:
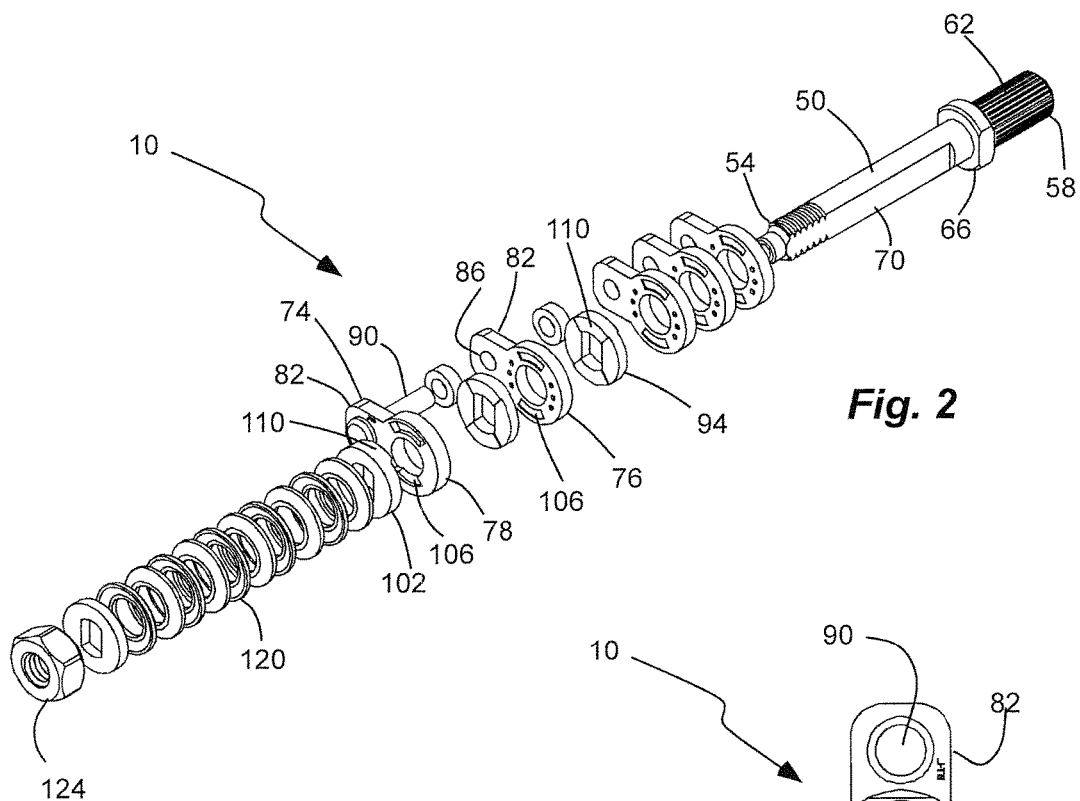
Figure 3:
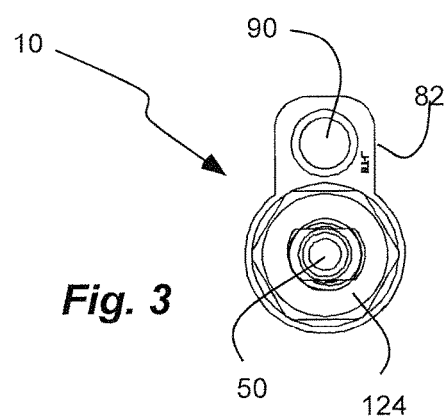
Figure 4:
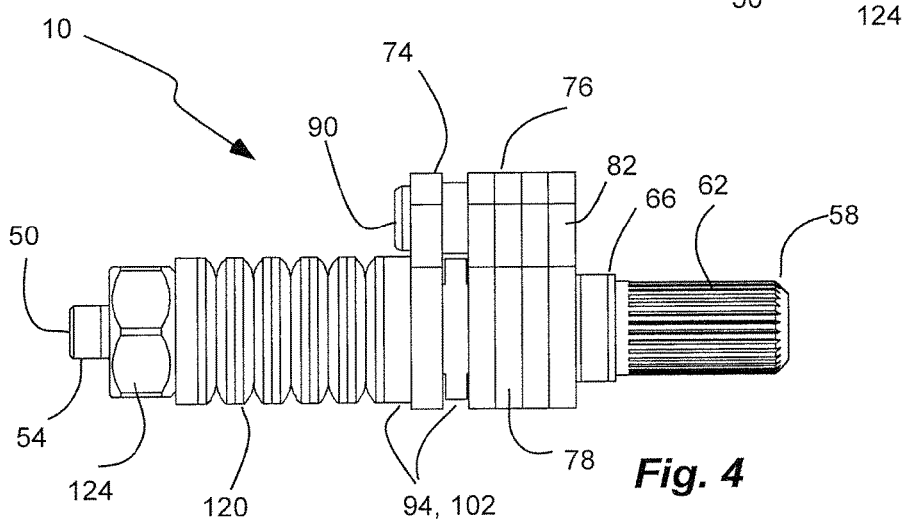
Figure 5A:
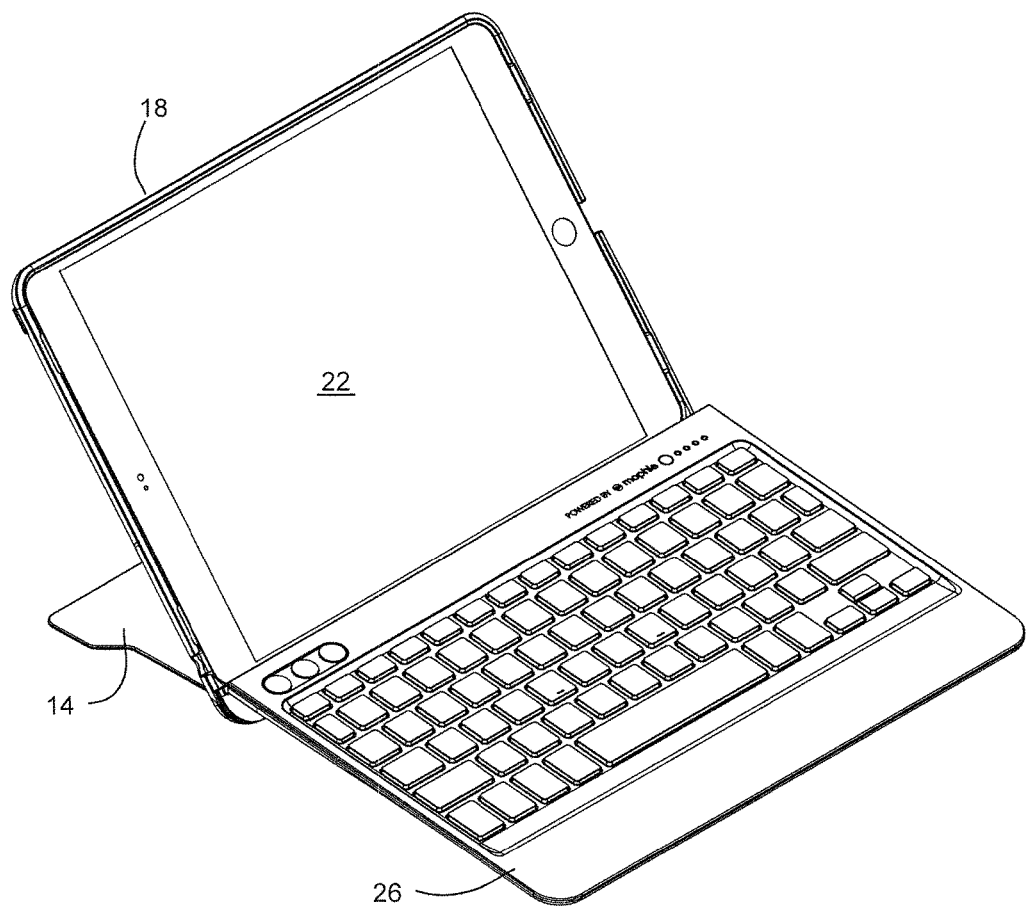
FIG. 5a is a keyboard folio with the friction hinge of FIG. 1a, and shown with a tablet computer therein and shown in a use configuration and with a kickstand in a deployed configuration.
Figure 5B:
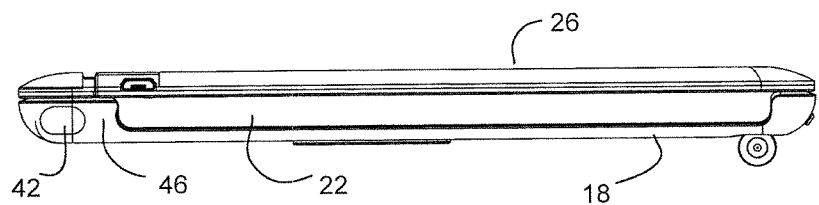
FIG. 5b is a side view of the keyboard folio of FIG. 5a with the friction hinge of FIG. 1a, and shown in a folded configuration and with the kickstand in a retracted configuration.
Figure 5C:
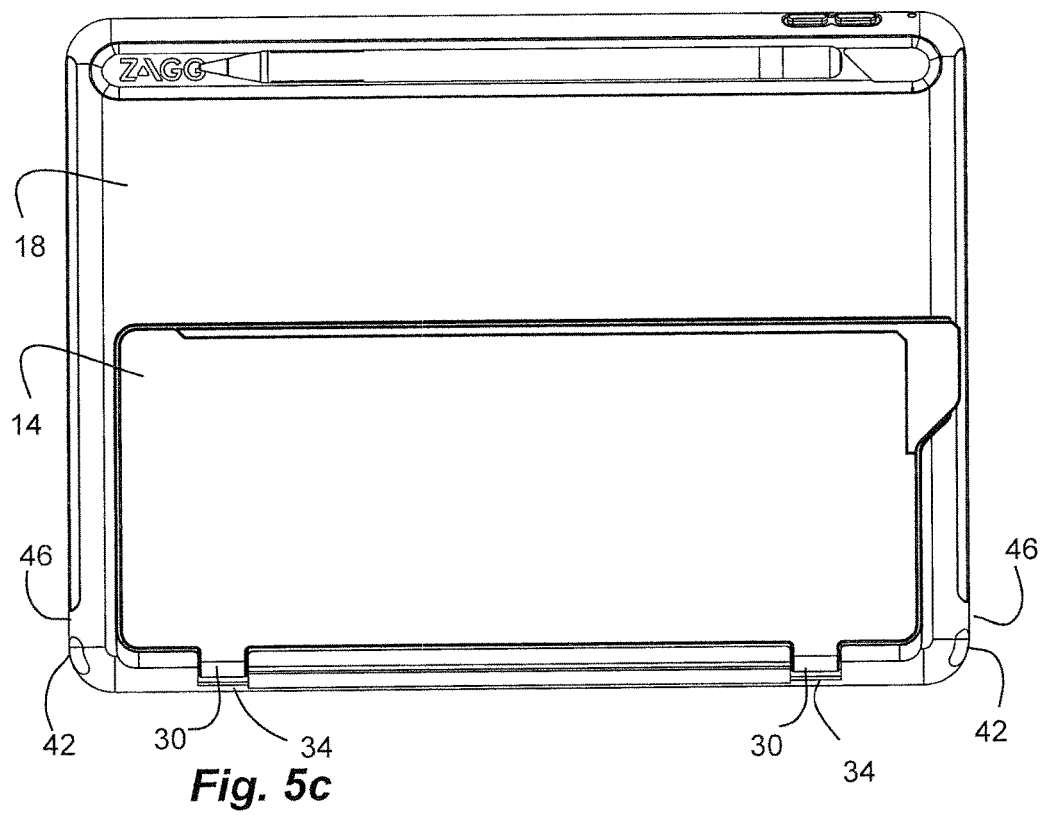
FIG. 5c is a rear view of the keyboard folio of FIG. 5a with the friction hinge of FIG. 1a, and shown with the kickstand in the retracted configuration.
Figure 5D:
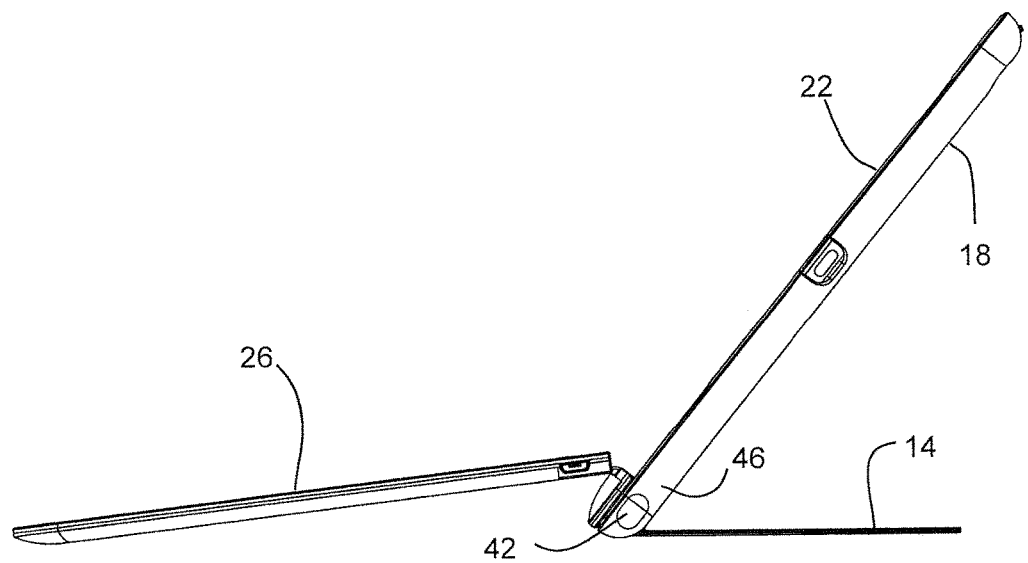
FIG. 5d is a side view of the keyboard folio of FIG. 5a with the friction hinge of FIG. 1a, and shown in the use configuration and the kickstand in the deployed configuration.
Figure 6A:
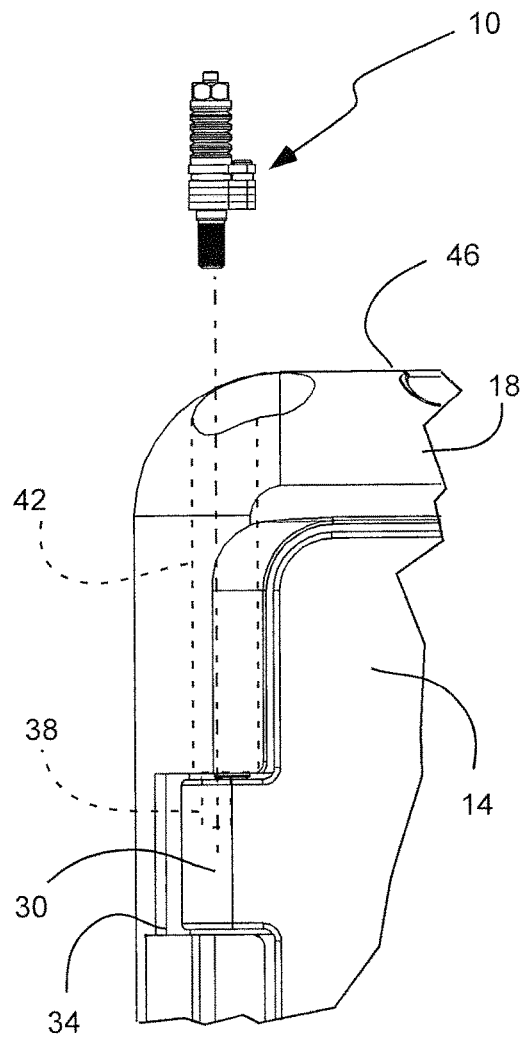
FIG. 6a is a partial rear view of the keyboard folio of FIG. 5a showing the friction hinge of FIG. 1a being installed.
Figure 6B:
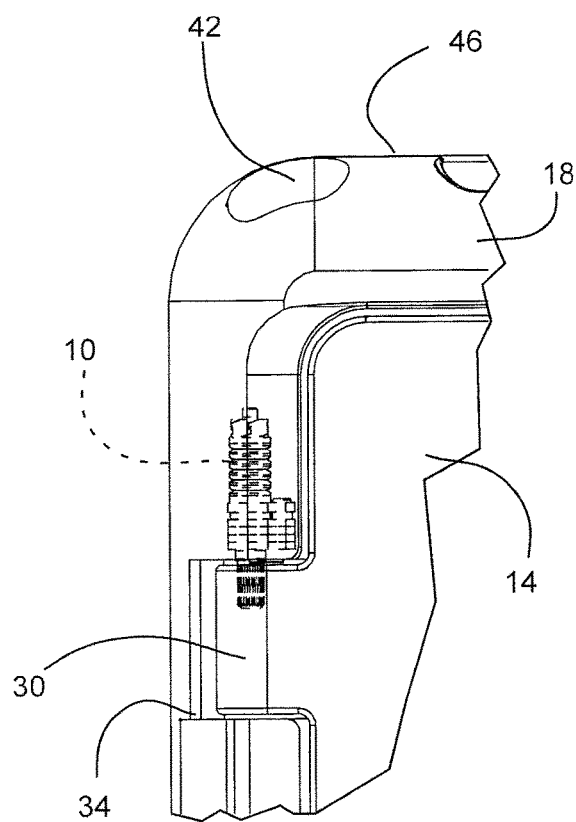
FIG. 6b is a partial rear view of the keyboard folio of FIG. 5a shown with the friction hinge of FIG. 1a installed.

As illustrated in FIGS. 1a-6b, a hinge, indicated generally at 10, in an example implementation in accordance with the invention is shown. The hinge 10 can be coupled between first and second members 14 and 18 to resistively hold an orientation between the first and second members at a plurality of orientations. In addition, the hinge 10 can bias the first and second members 14 and 18 in a predetermined set orientation, defining an auto-lock orientation. By way of example, the first member 14 can be a kickstand, and the second member 18 can be a shell sized and shaped to receive a table computer 22. The kickstand can be pivotally oriented with respect to the shell by the hinge. The predetermined set orientation of the hinge can correspond to a closed storage configuration of the kickstand with the kickstand against the shell. The kickstand and shell can be part of a keyboard folio including a keyboard 26 coupled to the shell, and operatively coupled to the tablet. The first member 14 or kickstand can have a lobe 30 extending into a notch 34 in the second member 18 or shell. The lobe 30 can have a bore 38 therein with a cross-sectional shape. The second member 18 or shell can have a slot 42 with a cross-sectional shape different than the cross-sectional shape of the bore of the lobe. The slot 42 can extend from a perimeter side 46 of the second member 18 of shell to the notch 34. The slot 42 of the second member 18 can be aligned with the bore 38 of the lobe 30 of the first member 14 or kickstand. The slot aligned with the bore allows for installation of the hinge 10, as discussed in greater detail below. In one aspect, the first and second members can be formed of plastic, and can be formed by injection molding.

The hinge 10 comprises an elongated shaft 50 having a proximal end 54 and a distal end 58. The distal end of the shaft can have a head 62 with a cross-sectional shape configured to mate with a shape of the bore 38 in the first member 14 (or lobe of the kickstand) so that the shaft 50 rotates with the first member 14 with respect to the second member 18. Thus, the head of the shaft can be inserted into the bore, and can be held in the bore to rotate with the first member (or with the lobe and the kickstand). In one aspect, a cross-sectional shape (taken perpendicularly to an axis of the head or shaft) of the head can mate with a cross-sectional shape of the bore. The head 62 can have a cross-sectional shape that is non-circular, such as by having a saw tooth shape with a plurality of teeth extending radially outwardly. Similarly, the bore can have a cross-sectional shape (taken perpendicularly to an axis of the bore) with a saw-tooth shape with a plurality of indentations extending radially outwardly that match and mate with the plurality of teeth. In another aspect, the cross-sectional shape of the head does not match the cross-sectional shape of the bore. In one aspect, the head can be press-fit in the bore. In another aspect, the head can be adhered in the bore with adhesive. In another aspect, the head can be embedded in the bore, such as by press-fitting or sonic welding.

The shaft 50 also can comprise a shoulder 66 adjacent to or proximate the head 62. The shoulder 66 can abut to the first member 14 (or the lobe of the kickstand), and can limit insertion of the head into the bore. In one aspect, the shoulder can have a greater width or diameter than the head. The shaft 50 also comprises an axel portion 70 on the shaft adjacent to or proximal the shoulder. The axel portion 70 has a cross-sectional shape that is non-circular. In one aspect, the axel portion can be keyed or can have a flat or opposite flats extending into a circumference of the axel portion. The proximal end 54 of the shaft 50 can be threaded. The elongated shaft 50, along with the head 62, the shoulder 66, the axel portion 70 and the threads can be formed of metal, and can be formed by machining.

The hinge 10 also comprises a key 74 rotatably disposed on the axel portion 70 of the shaft 50. Thus, the key pivots with respect to the shaft, the head, and the first member 14 (or the lobe of the kickstand). The key 74 can comprise a key plate 76. The key 74 or key plate 76 has a key ring 78 rotatably disposed on the axel portion 70 of the shaft 50. The key 74 or key plate 76 has a tab 82 that extends radially outward (with respect to the axis of the shaft) from the key ring 78. The tab 82 has a profile or shape (looking along an axis of the shaft) configured to mate with a shape (looking along an axis of the slot) of the slot 42 in the second member 18 (or shell), so that the key 74 rotates with the second member 18 with respect to the first member 14. Thus, the key 74 is affixed in the slot 42, by the mating profiles of the tab 82 and slot 42, or the tab extending into the slot; while the head 62 is affixed in the bore 38. The key 74 or key plate 76 can be formed of metal, and can be formed by stamping or machining.

In one aspect, the key 74 can comprise a plurality of keys or key plates 76 rigidly affixed together, or to one another. Each key plate 76 has a bore to rotatably receive the shaft 50 therein or therethrough. Each key plate 76 has a tab 82 extending from a key ring, and an aperture 86 in the tab. A rod 90 extends through the aperture 86 in each tab 82 of each key plate 76 to rigidly affix the plurality of key plates together. The rod can be a rivet affixed to the outermost key plates. Intermediate washers can be disposed between the tabs, and held by the rod, to resist bending the key plates. The key plates 76 affixed together can define the key 74. Thus, the key plates 76 are rigidly affixed to one another, and rotating together as the key 74 on the axel portion 70 of the shaft 50. In one aspect, one or more key plates 76 can be stacked or positioned adjacent one another, or bordering and abutting to one another, to increase a length of the key, and thus a width of the combined tabs 82 bearing against a wall of the slot 42 or the second member 18. In another aspect, one or more key plates can be separated, as discussed in greater detail below, to increase friction, and/or to widen the tab. The use of multiple key plates and tabs can allow force from the key to be distributed along the slot and the second member.

The key 74 and/or key plate 76 can have one or more bearing surfaces oriented to face axially with respect to the shaft, or along the axis of the shaft. Opposite sides of the key and/or the key plate can act as the bearing surfaces, so that the key or key plate can have opposite bearing surfaces. The bearing surfaces of the key or key plate can be defined by or carried by the key ring 78 or the key or key plate. As the key 74 and/or key plate 76 pivots or rotates on the shaft, the bearing surfaces abut to other bearing surfaces, as described below.

The hinge 10 also comprises a friction ring 94 (which can also be a detent ring as discussed below) disposed on the axel portion 70 of the shaft 50 and proximal the key 74. The friction ring 94 is keyed to the shaft and rotatable with the shaft 50, and with respect to the key 74. The friction ring 94 has a bore with a shape that mates with the cross-sectional shape of the axel portion 70 of the shaft 50. In one aspect, the shape of the bore can match the cross-sectional shape of the axel portion. The friction ring 94 can be disposed adjacent to and abutting to a key 74 and/or key plate 74. The friction ring 94 has a bearing surface oriented to face axially with respect to the shaft, and rotatably abutting to an opposing bearing surface of an adjacent key or key plate. Thus, as the key 74 and/or key plate 76 pivots or rotates on the shaft, the bearing surfaces of the key or key plate abut to and rotate against the bearing surfaces of the friction ring 94. And the friction ring 94 has a bearing surface rotatably abutting to an opposing bearing surface of an adjacent key or key plate. It is noted that friction is deliberately caused between the opposing bearing surfaces of the friction ring and the key or key plate to hold the relative orientation or position between the abutting friction ring and key or key plate absent an applied force. Thus, a friction fit or interference fit is formed between the friction ring and key or key plate using friction to deliberately resist movement. The friction between the bearing surfaces of the friction ring (or the detent ring) and the key or key plate defines a friction hold orientation (different than a predetermined set orientation defined below in which the detent is disposed in the dimple), in which the key or key plate is held with respect to the shaft by friction between the key or key plate and the friction ring (or detent ring). A lesser amount of force is required to rotate the key or key plate with respect to the shaft. The friction rings can be formed of metal, and can be formed by stamping or machining.

In one aspect, the friction ring 94 can comprise a plurality of friction rings. Each friction ring has a bore with a shape that mates with the cross-sectional shape of the axel portion of the shaft. Each friction ring has a bearing surface rotatably abutting to an opposing bearing surface of an adjacent key plate.

In one aspect, the friction ring 94 can be an intermediate friction ring disposed between adjacent keys 74 or key plates 76. The intermediate friction ring is on the axel portion of the shaft and rotatable with the shaft and with respect to the adjacent key plates. The intermediate friction ring has a bore with a shape that mates with the cross-sectional shape of the axel portion of the shaft. The intermediate friction ring has opposite bearing surfaces rotatably abutting to opposing bearing surfaces of the adjacent key plates. In one aspect, the key plate can be an intermediate key plate disposed between adjacent friction plates. The intermediate key plate has opposite bearing surfaces rotatably abutting to the opposing bearing surfaces of the adjacent key plates.

In one aspect, the hinge comprises a stack or a series of key plates and friction rings disposed on the axel portion of the shaft. The series of key plates and friction rings can comprise a plurality of key plates, or a plurality of friction rings, or both. In another aspect, the hinge comprises an alternating stack or an alternating series of key plates and friction rings. In one aspect, the series of key plates and friction rings (or dentent rings) can comprise at least one key plate and at least two friction rings (or detent rings). The key plate can be disposed between the friction rings. In another aspect, the series of key plates and friction rings (or dentend rings) can comprise at least two key plates and at least one friction ring (or detent ring). The friction ring can be disposed between the key plates.

The hinge 10 can further comprise a detent ring 102. As indicated above, the friction ring 94 can be or can define a detent ring. In another aspect, the detent ring can be separate and discrete from the friction ring. As with the friction ring, the detent ring 102 can be disposed on the axel portion 70 of the shaft 50 and proximal the key 74 or key plate 76. The detent ring 102 is keyed to the shaft and is rotatable with the shaft 50, and with respect to the key 74 or key plate 76. The detent ring 102 has a bore with a shape that mates with the cross-sectional shape of the axel portion 70 of the shaft 50. In one aspect, the shape of the bore can match the cross-sectional shape of the axel portion. The detent ring 102 can be disposed adjacent to and abutting to a key 74 and/or key plate 74.

A dimple is formed in the key ring of the key or the friction ring or the detent ring. In one aspect, a dimple 106 can be formed in the key ring 78 of the key 74 or key plate 76 (and is so shown for purposes of illustration). In another aspect, a dimple can be formed in the friction ring or the detent ring. A detent extends axially from another of the key ring or the friction ring or detent ring, and is removably received within the dimple. In one aspect, a detent 110 or protrusion can extend from the detent ring 102 (or the friction ring), and is removably received within the dimple 106 of the friction ring 78 (as is so shown for purposes of illustration). In another aspect, a detent can extend from the key ring. The detent 110 residing in the dimple 106 can define a predetermined set orientation (different than the friction hold orientation defined above), and an autolock orientation, between the detent ring (or friction ring) and the key or key plate (and thus the first and second members, or the kickstand and the shell). A greater amount of force is required to rotated the detent out of the dimple, and thus the key out of the predetermined set orientation.

In one aspect, the detent ring 102 can comprise a plurality of detent rings. Each detent ring has a bore with a shape that mates with the cross-sectional shape of the axel portion of the shaft. Each detent ring can have a bearing surface rotatably abutting to an opposing bearing surface of an adjacent key plate. And each detent ring can have a detent received in a dimple of an adjacent key ring of a key or key plate.

In one aspect, the detent ring 102 can be an intermediate detent ring disposed between adjacent keys or key plates. The intermediate detent ring can be disposed on the axel portion of the shaft and rotatable with the shaft and with respect to the adjacent key plates. The intermediate detent ring can have a bore with a shape that mates with the cross-sectional shape of the axel portion of the shaft. The intermediate detent ring can have a detent extending axially from the intermediate detent ring and into engagement with the key ring and removably received within the dimple of the key ring.

In one aspect, the hinge comprises a stack or a series of key plates and detent rings disposed on the axel portion of the shaft. The series of key plates and detent rings can comprise a plurality of key plates, or a plurality of detent rings, or both. In another aspect, the hinge comprises an alternating stack or an alternating series of key plates and detent rings. In one aspect, the series of key plates and friction rings (or dentent rings) can comprise at least one key plate and at least two friction rings (or detent rings). The key plate can be disposed between the friction rings. In another aspect, the series of key plates and friction rings (or dentend rings) can comprise at least two key plates and at least one friction ring (or detent ring). The friction ring can be disposed between the key plates.

Furthermore, the hinge comprises a spring 120 carried by the shaft 50, and biasing the key 74 or key plate 76 and the friction ring or detent ring together. In addition, the spring 120 biases the detent 110 into engagement with the dimple 106. Thus, the hinge can be biased towards the predetermined set orientation or the auto-lock orientation. In one aspect, the spring is a Belleville spring or Belleville washer, also known as a coned-disc spring, conical spring washer, disc spring, Belleville spring or cupped spring washer. The Belleville spring is a type of spring shaped like a washer with a frusto-conical shape which gives the washer a spring characteristic. The spring can comprise a plurality of Belleville type washers. The number of Belleville type washers can determine the spring constant and/or amount of deflection. Stacking the Belleville type washers in the same direction will add the spring constant in parallel to create a stiffer joint while maintaining the same deflection; while stacking the Belleville type washers in alternating directions will add the spring constant in series to create a lower spring constant with greater deflection. The number and orientation of the Belleville type washers allows a specific spring constant and deflection to be designed. In another aspect, the spring can be a coil spring. In one aspect, the hinge 10 can comprise a fastener 124, such as a lock nut, disposed on the shaft 50 with the spring 120 between the fastener and the key and/or friction or detent ring. The fastener 124 can be axially displaceable to vary a force of the spring against the key and the friction/detent ring. Thus, the fastener can vary the amount of friction between the key and the friction/detent ring, and thus vary an amount of torque required to pivot the key with respect to the shaft.

The key 74 and/or key plates 76 are held in position with respect to the axel portion 70 of the shaft 50, and thus the second member 18 is held in position with respect to the first member 14, by friction between the key 74 or key plates 76 and the friction ring 94 or detent ring 102. The key 74 rotates on the shaft between a plurality of different orientations, including at least: a predetermined set orientation, and a friction hold orientation, different than the predetermined set orientation. In the predetermined set orientation, the detent 110 is disposed in the dimple 106, defining an autolock orientation, and a greater amount of force is required to rotated the key out of the predetermined set orientation. In the friction hold orientation, the detent 110 is disposed out of the dimple 106, and the key is held with respect to the shaft by friction between the key and the friction ring or dentent ring, and a lesser amount of force is required to rotate the key with respect to the shaft.

As described above, the head 62 has a cross-sectional shape mating with the cross-sectional shape of the bore 38 of the lobe 30 (of the first member 14 or kickstand) so that the head is fixedly retained within the bore, and with respect to the first member 14 (or kickstand). And the key 74 has a cross-sectional shape mating with the cross-sectional shape of the slot 42 so that the key is fixedly retained within the slot, and with respect to the second member 18 (or shell). In one aspect, the cross-sectional size of the slot 42 can be larger than a cross-sectional size of the bore 38. Similarly, the key can have a cross-sectional size greater than a cross-sectional size of the head. The cross-sectional shape of head can be smaller than cross-sectional shape of the hinge and perimeter profile of head fits within perimeter profile of hinge. Thus, the hinge 10 is capable of being inserted into the slot 42 through the perimeter side 46 (or opening therein to the slot) of the second member 18 (or shell) until the head 62 is retained in the bore 38 of the lobe 30 of the first member 14 (or kickstand), and the key 74 is retained in the slot 42 of the second member 18. The hinge is adapted to facilitate assembly with the first and second members.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A hinge coupled between first and second members to resistively hold an orientation between the first and second members at a plurality of orientations, and to bias the first and second members in a predetermined set orientation, the first member having a lobe extending into a notch in the second member, the lobe having a bore therein with a cross-sectional shape, and the second member having a slot with a cross-sectional shape different than the cross-sectional shape of the bore of the lobe, the slot extending from a perimeter side of the second member to the notch, and the slot of the second member being aligned with the bore of the lobe of the first member, the hinge comprising:
   a) an elongated shaft having a proximal end and a distal end;
   b) a head on the distal end of the shaft and having a cross-sectional shape mating with the cross-sectional shape of the bore in the first member so that the head is fixedly retained within the bore such that the shaft rotates with the first member with respect to the second member;
   c) an axel portion on the shaft and having a cross-sectional shape that is non-circular;
   d) a key rotatably disposed on the axel portion of the shaft;
   e) the key having a key ring rotatably disposed on the axel portion of the shaft;
   f) a tab extending from the key ring and having a cross-sectional shape mating with the cross-sectional shape of the slot in the second member so that the key is fixedly retained within the slot such that the key rotates with the second member with respect to the first member;
   g) a friction ring disposed on the axel portion of the shaft proximal the key and rotatable with the shaft and with respect to the key;
   h) the friction ring having a bore with a shape that mates with the cross-sectional shape of the axel portion of the shaft;
   i) a dimple formed in the key ring of the key or the friction ring;
   j) a detent extending axially from the other of the key ring or the friction ring and removably received within the dimple;
   k) a spring carried by the shaft and biasing the key and the friction ring together, and biasing the detent into engagement with the dimple;
   l) a fastener disposed on the shaft with the spring between the fastener and the key and the friction ring;
   m) the key being held in position with respect to the axel portion, and thus the second member configured to be held in position with respect to the first member, by friction between the key and the friction ring;
   n) the key rotating on the shaft between a plurality of different orientations, including at least:
      i) a predetermined set orientation in which the detent is disposed in the dimple, defining an autolock orientation, and in which a greater amount of force is required to rotated the key out of the predetermined set orientation; and
      ii) a friction hold orientation, different than the predetermined set orientation, in which the detent is disposed out of the dimple, and in which the key is held with respect to the shaft by friction between the key and the friction ring, and in which a lesser amount of force is required to rotate the key with respect to the shaft.

2. The hinge in accordance with claim 1, further comprising:
   the fastener being axially displaceable to vary a force of the spring against the key and the friction ring, and thus vary the amount of friction between the key and the friction ring, and thus vary an amount of torque required to pivot the key with respect to the shaft.

3. The hinge in accordance with claim 1, wherein the key and the friction ring further comprise:
   a) a series of key plates and friction rings disposed on the axel portion of the shaft, comprising a plurality of key plates, or a plurality of friction rings, or both;
   b) the key plates being rigidly affixed to one another and rotating together as the key on the axel portion of the shaft;
   c) each key plate having a bore to rotatably receive the shaft therein;
   d) each key plate having a tab and an aperture in the tab;
   e) a rod extending through the aperture in each tab of each key plate to rigidly affix the plurality of key plates together;
   f) each key plate having a bearing surface oriented to face axially with respect to the shaft;
   g) the friction rings being rotatable with the shaft and with respect to adjacent key plates;

h) each friction ring having a bore with a shape that mates with the cross-sectional shape of the axel portion of the shaft; and i) each friction ring having a bearing surface rotatably abutting to an opposing bearing surface of an adjacent key plate.

4. The hinge in accordance with claim 3, wherein the series of key plates and friction rings comprise at least one key plate and at least two friction rings.

5. The hinge in accordance with claim 3, wherein the series of key plates and friction rings comprise at least two key plates and at least one friction ring.

6. The hinge in accordance with claim 1, wherein the key further comprises:
   a) a plurality of key plates rigidly affixed to one another;
   b) each key plate having a bore to rotatably receive the shaft therein;
   c) each key plate having a tab and an aperture in the tab; and
   d) a rod extending through the aperture in each tab of each key plate to rigidly affix the plurality of key plates together.

7. The hinge in accordance with claim 6, further comprising:
   a) an intermediate friction ring disposed between adjacent key plates of the plurality of key plates;
   b) the intermediate friction ring disposed on the axel portion of the shaft and rotatable with the shaft and with respect to the adjacent key plates;
   c) the intermediate friction ring having a bore with a shape that mates with the cross-sectional shape of the axel portion of the shaft; and
   d) the intermediate friction ring having, opposite bearing surfaces rotatably abutting to opposing bearing surfaces of the adjacent key plates.

8. The hinge in accordance with claim 6, further comprising:
   a) each key plate having a dimple formed in a key ring thereof;
   b) an intermediate detent ring disposed between adjacent key plates of the plurality of key plates;
   c) the intermediate detent ring disposed on the axel portion of the shaft and rotatable with the shaft and with respect to the adjacent key plates;
   d) the intermediate detent ring having a bore with a shape that mates with the cross-sectional shape of the axel portion of the shaft; and
   e) the intermediate detent ring having a detent extending axially from the intermediate detent ring and into engagement with the key ring and removably received within the dimple of the key ring.

9. The hinge in accordance with claim 1, wherein the key and the friction ring further comprise:
   a) a series of key plates and detent rings disposed on the axel portion of the shaft;
   b) the key plates being rigidly affixed to one another and rotating together as the key on the axel portion of the shaft;
   c) each key plate having a bore to rotatably receive the shaft therein;
   d) each key plate having a tab extending from the key ring:
   e) each key plate having a dimple formed in a key ring thereof;
   f) each detent ring being rotatable with the shaft and with respect to the key plates;
   g) each detent ring having a bore with a shape that mates with the cross-sectional shape of the axel portion of the shaft; and
   h) each detent ring having a detent extending axially from the intermediate detent ring, and into engagement with the key ring and removably received within the dimple of an adjacent key ring.

10. The hinge in accordance with claim 1, wherein:
    the first member is a kickstand and the second member is a shell sized and shaped to receive a table computer, the kickstand being pivotally oriented with respect to the shell by the hinge; and
    the predetermined set orientation of the hinge corresponds to a closed storage configuration of the kickstand with the kickstand against the shell.

11. The hinge in accordance with claim 1, further comprising:
    a cross-sectional size of the slot being larger than a cross-sectional size of the bore so that the hinge is capable of being inserted into the slot through the perimeter side of the second member until the head is retained in the bore of the lobe of the first member and the key is retained in the slot of the second member.

12. A hinge configured to be coupled between first and second members, and configured to resistively hold an orientation between the first and second members at a plurality of orientations, the hinge comprising:
    a) an elongated shaft having a proximal end and a distal end;
    b) a head on the distal end of the shaft and having a cross-sectional shape configured to mate with a shape of a bore in the first member such that the shaft rotates with the first member with respect to the second member;
    c) an axel portion on the shaft having a cross-sectional shape that is non-circular;
    d) a series of key plates and friction rings disposed on the axel portion of the shaft, comprising a plurality of key plates, or a plurality of friction rings, or both;
    e) the key plates being rigidly affixed to one another and rotating together as a key on the axel portion of the shaft;
    f) each key plate having a bore to rotatably receive the shaft therein;
    g) each key plate having a tab extending from a key ring;
    h) each key plate having a bearing surface oriented to face axially with respect to the shaft;
    i) the friction rings being rotatable with the shaft and with respect to adjacent key plates;
    j) each friction ring having a bore with a shape that mates with the cross-sectional shape of the axel portion of the shaft;
    k) each friction ring having a bearing surface rotatably abutting to an opposing bearing surface of an adjacent key plate;
    l) a spring carried by the shaft and biasing the series of key plates and friction rings together;
    m) a fastener disposed on the shaft with the spring between the fastener and the series of key plates and friction rings; and
    n) the key plates being held in position with respect to the axel portion, and thus the second member configured to be held in position with respect to the first member, by friction between the series of key plates and friction rings.

13. The hinge in accordance with claim 12, further comprising:

the fastener being axially displaceable to vary a force of the spring against the series of key plates and friction rings, and thus vary the amount of friction between the key plates and the friction rings, and thus vary an amount of torque required to pivot the key plates with respect to the shaft.

14. The hinge in accordance with claim 12, further comprising:
   a) an adjacent key plate and friction ring:
   b) a dimple formed one of the adjacent key plate and friction ring;
   c) a detent extending axially from the other of the adjacent key ring and friction plate, and removably received within the dimple;
   d) the spring biasing the detent into engagement with the dimple;
   e) the key rotating on the shaft between a plurality of different orientations, including at least:
      i) a predetermined set orientation in which the detent is disposed in the dimple, defining an autolock orientation, and in which a greater amount of force is required to rotated the key out of the predetermined set orientation; and
      ii) a friction hold orientation, different than the predetermined set orientation, in which the detent is disposed out of the dimple, and in which the key is held with respect to the shaft by friction between the key plates and the friction rings, and in which a lesser amount of force is required to rotate the key with respect to the shaft.

15. The hinge in accordance with claim 12, wherein the series of key plates and friction rings comprise at least one key plate and at least two friction rings.

16. The hinge in accordance with claim 12, wherein the series of key plates and friction rings comprise at least two key plates and at least one friction ring; each key plate having an aperture in the tab; and further comprising a rod extending through the aperture in each tab of each key plate to rigidly affix the plurality of key plates together.

17. A hinge configured to be coupled between first and second members, and configured to resistively hold an orientation between the first and second members at a plurality of orientations, and configured to bias the first and second members in a predetermined set orientation, the hinge comprising:
   a) an elongated shaft having a proximal end and a distal end;
   b) a head on the distal end of the shaft and having a cross-sectional shape configured to mate with a shape of a bore in the first member such that the shaft rotates with the first member with respect to the second member;
   c) a shoulder on the shaft adjacent to the head and configured to abut to the first member;
   d) a series of key plates and friction rings disposed on the axel portion of the shall, comprising a plurality of key plates, or a plurality of friction rings, or both;
   e) the key plates being rigidly affixed to one another and rotating together as a key on the axel portion of the shaft;
   f) each key plate having a bore to rotatably receive the shaft therein;
   g) each key plate having a tab and an aperture in the tab;
   h) a rod extending through the aperture in each tab of each key plate to rigidly affix the plurality of key plates together;
   i) each key plate having a bearing surface oriented to face axially with respect to the shaft;
   j) the friction rings being rotatable with the shaft and with respect to adjacent key plates;
   k) each friction ring having a bore with a shape that mates with the cross-sectional shape of the axel portion of the shaft;
   l) each friction ring having a bearing surface rotatably abutting to an opposing bearing surface of an adjacent key plate;
   m) a dimple formed in the key ring of the key or the friction ring;
   n) a detent extending axially from the other of the key ring or the friction ring and removably received within the dimple;
   o) a spring carried by the shaft and biasing the key and the friction ring together, and biasing the detent into engagement with the dimple;
   p) a fastener disposed on the shaft with the spring between the fastener and the detent ring;
   q) the key being held in position with respect to the axel portion, and thus the second member configured to be held in position with respect to the first, member, by friction between the key and the friction ring;
   r) the key rotating on the shaft between a plurality of different orientations, including at least:
      i) a predetermined set orientation in which the detent is disposed in the dimple, defining an autolock orientation, and in which a greater amount of force is required to rotated the key out of the predetermined set orientation; and
      ii) a friction hold orientation, different than the predetermined set orientation, in which the detent is disposed out of the dimple, and in which the key is held with respect to the shaft by friction between the key and the friction ring, and in which a lesser amount of force is required to rotate the key with respect to the shaft.

18. The hinge in accordance with claim 17, further comprising:
   the fastener being axially displaceable to vary a force of the spring against the series of key plates and friction rings, and thus vary the amount of friction between the key plates and the friction rings, and thus vary an amount of torque required to pivot the key plates with respect to the shaft.

19. The hinge in accordance with claim 17, wherein the series of key plates and friction rings comprising at least one key plate and at least two friction rings, or at least two key plates and at least one friction ring.

* * * * *